US012313420B2

(12) United States Patent
Baughman et al.

(10) Patent No.: US 12,313,420 B2
(45) Date of Patent: May 27, 2025

(54) VEHICLE BASED EXTERNAL ENVIRONMENT AUGMENTATION FOR OPERATOR ALERTNESS

(71) Applicant: International Business Machines Corporation, Armonk, NY (US)

(72) Inventors: Aaron K. Baughman, Cary, NC (US); Shikhar Kwatra, San Jose, CA (US); Diwesh Pandey, Bangalore (IN); Tathagato Bose, Kolkata (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 195 days.

(21) Appl. No.: 17/529,481

(22) Filed: Nov. 18, 2021

(65) Prior Publication Data

US 2023/0152115 A1    May 18, 2023

(51) Int. Cl.
*G01C 21/36* (2006.01)
*G01C 21/34* (2006.01)

(52) U.S. Cl.
CPC ....... *G01C 21/365* (2013.01); *G01C 21/3484* (2013.01); *G01C 21/3617* (2013.01); *G01C 21/3629* (2013.01); *G01C 21/3638* (2013.01); *G01C 21/3691* (2013.01)

(58) Field of Classification Search
CPC .............. G01C 21/365; G01C 21/3484; G01C 21/3617; G01C 21/3629; G01C 21/3638; G01C 21/3691
See application file for complete search history.

(56) References Cited

U.S. PATENT DOCUMENTS

| | | | |
|---|---|---|---|
| 6,446,002 B1 | 9/2002 | Barton | |
| 8,370,062 B1 | 2/2013 | Starenky et al. | |
| 8,600,667 B2 | 12/2013 | Ranford | |
| 8,909,476 B2 | 12/2014 | Tuukkanen | |
| 8,930,135 B2 | 1/2015 | Abramovich Ettinger | |
| 9,648,088 B1 | 5/2017 | Pande et al. | |
| 10,286,915 B2 | 5/2019 | Xiao et al. | |
| 10,996,074 B2 | 5/2021 | Pandey et al. | |

(Continued)

FOREIGN PATENT DOCUMENTS

EP    2522160 B1    12/2013

OTHER PUBLICATIONS

Mody et al., WiMo: location-based emotion tagging, Nov. 22-25, 2009, MUM '09: Proceedings of the 8th International Conference on Mobile and Ubiquitous Multimedia, Article No. 14, pp. 1-4.

(Continued)

*Primary Examiner* — Jess Whittington
*Assistant Examiner* — Terry C Buse
(74) *Attorney, Agent, or Firm* — Garg Law Firm, PLLC; Rakesh Garg; Michael O'Keefe

(57) ABSTRACT

A route from a first physical location to a second physical location is divided into a set of segments using a route optimization engine. Using a user response analysis model, a response to a physical environment associated with a segment in the set of segments is scored, the scoring resulting in a score. Using a content generation model and the score, the physical environment is augmented, the augmenting combining the physical environment and a generated environment.

19 Claims, 9 Drawing Sheets

(56) References Cited

U.S. PATENT DOCUMENTS

| | | | |
|---|---|---|---|
| 2007/0150188 A1* | 6/2007 | Rosenberg | G01C 21/3647 |
| | | | 701/431 |
| 2008/0051997 A1* | 2/2008 | Rosenberg | G01C 21/3647 |
| | | | 701/431 |
| 2013/0132477 A1 | 5/2013 | Bosworth et al. | |
| 2013/0198633 A1 | 8/2013 | Hyman | |
| 2014/0358425 A1 | 12/2014 | Seth et al. | |
| 2020/0011678 A1 | 1/2020 | Patel | |
| 2020/0124432 A1* | 4/2020 | Heap | G05D 1/0217 |
| 2021/0200852 A1* | 7/2021 | Gupta | G06F 21/33 |
| 2021/0380080 A1* | 12/2021 | Bielby | B60W 40/08 |
| 2022/0224963 A1* | 7/2022 | Herz | G06Q 50/40 |
| 2023/0166072 A1* | 6/2023 | Malchano | A61N 5/0618 |
| | | | 600/27 |

OTHER PUBLICATIONS

Wang et al., Deep learning based mood tagging for Chinese song lyrics, Jun. 15, 2019.

* cited by examiner

VEHICLE BASED EXTERNAL ENVIRONMENT AUGMENTATION FOR OPERATOR ALERTNESS

BACKGROUND

The present invention relates generally to a method, system, and computer program product for augmented reality generation. More particularly, the present invention relates to a method, system, and computer program product for vehicle based external environment augmentation for operator alertness.

Augmented reality is an interactive experience of a real-world environment in which objects in a real or physical environment are enhanced by computer-generated information using one or more sensory modalities such as visual, auditory, haptic, and olfactory, generating a virtual environment. In some implementations, the virtual environment is overlaid on top of the real environment (e.g. by projecting a computer-generated image into a portion of a user's vision or using a computer-generated image through which the real environment remains visible), while in other implementations the virtual environment replaces the real environment (e.g. by projecting a computer-generated image into a user's entire visual field using goggles or providing sound through headphones that do not let in external sound). A user is typically able to interact in real time with objects in both the real and virtual environments. Generation of an augmented reality environment is also referred to as environment augmentation.

A vehicle transports people or objects from one physical location to another. An autonomous vehicle (AV) is a vehicle that is capable of sensing its environment and moving safely with little or no human input. Thus, a vehicle is operable by a human user, a machine (as in an AV), or a combination of a human user and a machine (e.g., a human pilot utilizing an autopilot for some or all portions of a flight). Some non-limiting examples of a vehicle are cars, trucks, tractors, aircraft, and boats. A vehicle user is a vehicle operator (either human or machine, or a combination), or a passenger in a vehicle.

SUMMARY

The illustrative embodiments provide a method, system, and computer program product. An embodiment includes a method that divides, into a set of segments using a route optimization engine, a route from a first physical location to a second physical location. An embodiment scores, using a user response analysis model, a response to a physical environment associated with a segment in the set of segments, the scoring resulting in a score. An embodiment augments, using a content generation model and the score, the physical environment, the augmenting combining the physical environment and a generated environment.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
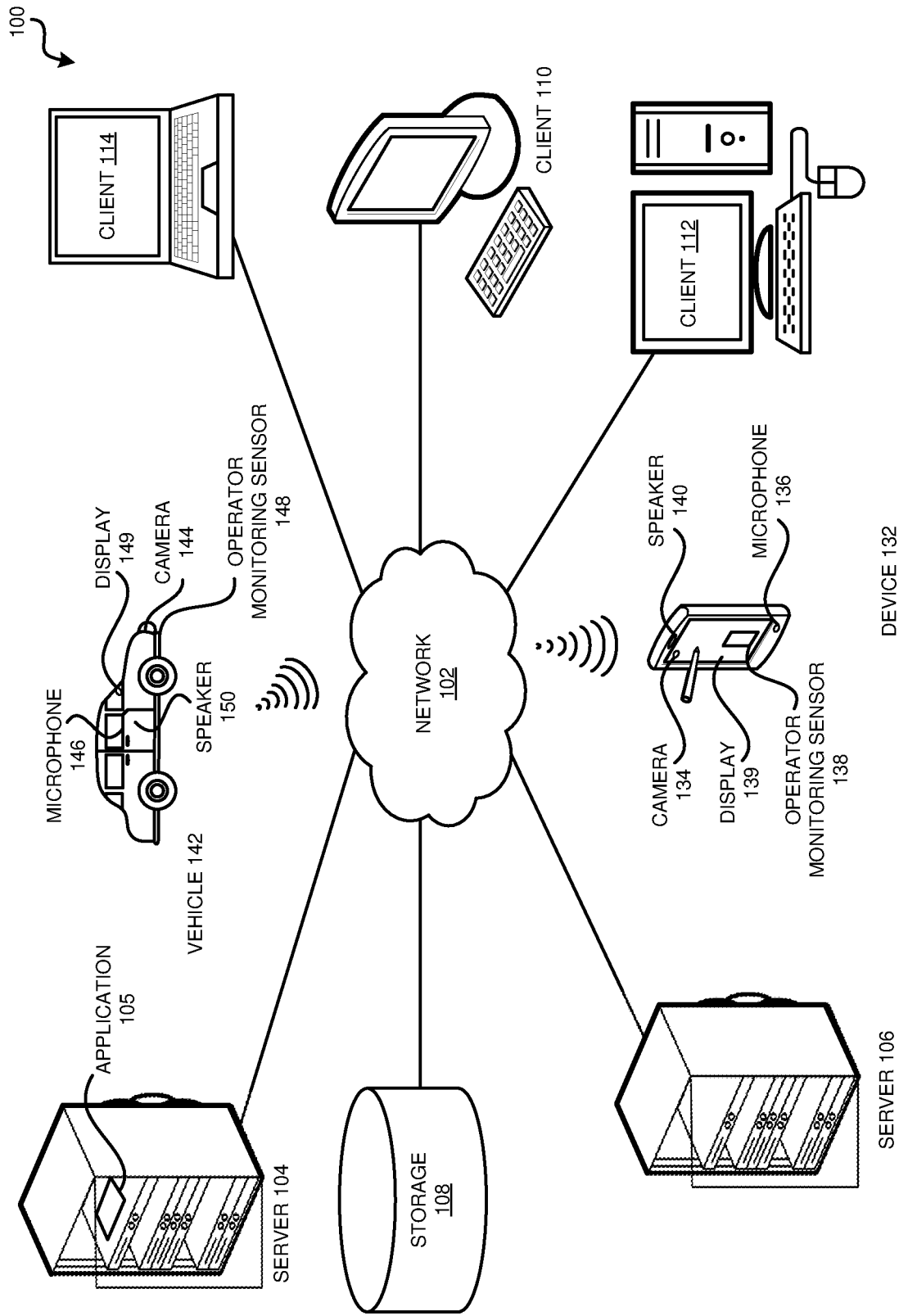
FIG. 1 depicts a block diagram of a network of data processing systems in which illustrative embodiments may be implemented.

The illustrative embodiments recognize that maintaining alertness in a vehicle operator is a known problem. The operator must be alert enough to respond quickly when necessary (e.g. to avoid an obstacle on a road). However, traversing long distances when the landscape, vehicle route, and weather change very gradually, and consequently the operator has little to do, sap an operator's alertness. For example, driving through a flat landscape on a straight road with little other traffic might be so boring that a driver might fail to react in time when a car in front brakes suddenly, or the driver might even fall asleep. A similar problem can occur when an airplane pilot's main task is to monitor an autopilot. In addition, although a non-human AV operator does not fall asleep, if an AV is learning from its environment, the AV can become overfit or underfit to the current environment and fail to react appropriately to a change in the environment below a particular size or rate of change.

The illustrative embodiments also recognize that techniques are presently available to detect a human operator's lack of alertness and suggest taking a rest. However, rest is not always a viable option. For example, a driver may be on a road without an available rest area, or an airplane pilot might not be near a suitable landing area. In addition, taking a rest adds delay to a journey. Consequently, the illustrative embodiments recognize that there is an unmet need to maintain vehicle operator alertness without adding delay or a detour to a journey.

The illustrative embodiments recognize that the presently available tools or solutions do not address these needs or provide adequate solutions for these needs. The illustrative embodiments used to describe the invention generally address and solve the above-described problems and other problems related to vehicle based external environment augmentation for operator alertness.

An embodiment can be implemented as a software application. The application implementing an embodiment can be configured as a modification of an existing vehicle operator monitoring system or vehicle operating system, as a separate application that operates in conjunction with an existing vehicle operator monitoring system or vehicle operating system, a standalone application, or some combination thereof.

Particularly, some illustrative embodiments provide a method that divides a route into a set of segments, scores a response to a physical environment associated with a segment in the set of segments, and augments, using a content generation model and the score, the physical environment by combining the physical environment and a generated environment.

An embodiment receives data of a vehicle user. The data includes starting and ending physical locations of a journey for which the user is using the vehicle. One embodiment receives starting and ending physical locations via a user interface from the user. Another embodiment receives starting and ending physical locations indirectly, for example from route information entered into a mapping application, from route plan data provided to a third party (e.g. a flight plan for an aircraft or a float plan for a boat), or from a user's online activities monitored on an opt-in basis. Optionally, the user data also includes profile data of a user, such as user-supplied data regarding preferences in audio content or physical environment, or data regarding the user's previous interactions with an embodiment.

An embodiment also receives data of a physical environment of the vehicle. Some non-limiting examples of a physical environment of the vehicle are a road on which a vehicle is travelling, terrain along the vehicle's route, and an atmospheric condition along the vehicle's route. The data of a physical environment includes data of a present condition of the environment, and optionally data of a future condition (e.g. a weather forecast for an area along the route for a time at which the vehicle will be in the area). In embodiments, the data of a physical environment includes image data (e.g. obtained using a still image or video camera), audio data (e.g. obtained using a microphone), or both.

An embodiment also receives data of one or more preset environments of the vehicle. A preset environment is a previously generated environment or a component of a previously generated environment. A generated environment is a virtual environment displayable using a component of an augmented reality system.

An embodiment uses a route optimization engine and available physical environment data to optimize a vehicle's route between supplied endpoints and to divide a vehicle's route from one physical location to another into one or more segments. A route optimization engines uses a presently known technique to optimize a vehicle's route between supplied endpoints. In one embodiment, all the route segments are equal in size. Another embodiment uses the physical environment data to set a segment boundary where some aspect of the physical environment of the route changes, or is expected to change, by more than a threshold amount. For example, an embodiment might place a segment boundary where a route changes from a six-lane highway to a rural road, where treeless terrain changes to terrain with more than a threshold percentage of trees, where flat terrain changes to terrain with hills, or where an area forecast to have clear skies changes to an area forecast to have rain.

An embodiment uses a user response analysis model to score a user's response to a physical environment associated with a segment in the set of segments. In one embodiment, the scored user response corresponds to an alertness level of a user. Techniques for determining a user's alertness, or conversely a user's drowsiness, are presently known. Some example techniques include monitoring a driver's steering wheel inputs to determine a pattern associated with alertness or drowsiness, using a camera to monitor a vehicle's position within a lane of a road (drifting out of lane, or a pattern of drifting, can indicate drowsiness), using a camera to detect a pattern associated with alertness or drowsiness in a driver's face or eye movements (e.g. head nodding or eyes closing), using one or more sensors to detect a pattern associated with alertness or drowsiness in measured parameters such as brain activity, heart rate, skin conductance, muscle activity, and the like, and using a microphone monitoring sounds within a vehicle to detect a pattern associated with alertness or drowsiness (e.g. singing along with music might indicate alertness, while snoring indicates that a user is sleeping). In another embodiment, the scored user response corresponds to a mood or sentiment of a user, for example a score within a range from happy to sad or calm to angry. Techniques for scoring user mood are also presently known. In one embodiment, the scored user response is binary (e.g. alert or not alert). In another embodiment, the scored user response is a number within a range (e.g. 6 within a 0-10 range, or 0.6 within a 0-1 range).

Based on the score of a user's response to a physical environment, an embodiment generates an environment intended to maintain or improve the user's score. To generate the environment, an embodiment uses a content generation model to generate new content or adjust a preset environment or data of a physical environment. In one embodiment, the content generation model is implemented using a trained Generative Adversarial Network (GAN). A GAN is a presently known model that includes wo sub-models: a generator model trained to generate new examples of input data, and a discriminator model that tries to classify generated examples as either real (from real input data) or fake (generated by the generator). The two sub-models are trained together until the discriminator is fooled about half the time, meaning the generator is generating plausible examples.

In particular, an embodiment uses an image content generation model to generate or adjust an input image, such as an image component of a preset environment or image data of a physical environment of a vehicle, generating an image depicting a generated environment. In one embodiment, the generated environment includes a depiction of a route of travel. For example, the generated environment might include an enhancement of a road's boundary or lane markings, which could be useful to assist a driver in low visibility conditions such as fog. As another example, the generated environment might include a schematic depiction of a route of flight of an aircraft, to assist a pilot in piloting along that route of flight. In another embodiment, the generated environment includes a depiction of terrain associated with a route of travel. For example, the generated environment might include a depiction of trees, mountains, a beach, or another terrain feature, intended to assist a user in maintaining alertness by providing interesting scenery. In another embodiment, the generated environment includes a depiction of an atmospheric condition associated with a route of travel. For example, the generated environment might include a depiction of clouds intended to alter an effect of too much sun, or a depiction of a clear sky intended to alter an effect of an overcast.

An embodiment selects and displays an image depicting the generated environment on a display visible to a vehicle user. One embodiment displays the generated environment as an overlay on top of the real environment of the vehicle, thereby augmenting the real environment by combining the generated and real environments within a user's field of view. Another embodiment replaces the real environment with the generated environment, for example by projecting a computer-generated image into a user's entire visual field using virtual reality goggles. In one embodiment, real environment replacement is only provided to a vehicle passenger, not a vehicle operator required to monitor the real environment during operation.

An embodiment uses an audio content generation model to adjust audio data, such as an audio component of a preset environment or audio data of a physical environment of a vehicle, generating audio data of a generated environment. For example, the generated environment might include birdsong or music.

An embodiment uses an audio output device audible to a vehicle operator to provide an audio component of the generated environment to a vehicle user. One embodiment augments the real environment by combining the generated and real environments within a user's hearing, for example by using an output device that lets in external sound, such as speaker. Another embodiment replaces the real environment with the generated environment, for example by providing sound through headphones that do not let in external sound. In one embodiment, real environment replacement is only provided to a vehicle passenger, not a vehicle operator required to monitor the real environment during operation.

An embodiment generates data that is not image or audio data. Some non-limiting examples of data that is not image or audio data are a vibration pattern (e.g. within a steering wheel or a vehicle seat) and input data to a vehicle's environmental system (e.g. to adjust vehicle heating or air conditioning to attain a particular temperature, or to generate a particular smell). An embodiment uses an output device to provide the generated data to a vehicle user, thus combining the generated and real environments for a user.

An embodiment uses a user response analysis model to score a user's response to an augmented environment associated with a segment in a manner described herein. The embodiment uses the user's response to further adapt a model used for environment generation to a particular user. For example, one user's alertness might improve when flat, treeless terrain is augmented with images of trees and hills. As a result, the model learns that images of trees and hills improve this user's alertness, and will generate such images for this user in the future. As another example, User A's alertness might improve when a particular song is provided, while User B's alertness might decrease when that same song is provided. As a result, the model learns to use the song for User A but not for User B. Techniques for adapting a model based on a response to a previous model output are presently known. An embodiment stores user data, including a user's response to a generated environment, in a user profile.

An embodiment stores a generated environment in a library of present environments, for use as preset environment data.

The manner of vehicle based external environment augmentation for operator alertness described herein is unavailable in the presently available methods in the technological field of endeavor pertaining to vehicle operations. A method of an embodiment described herein, when implemented to execute on a device or data processing system, comprises substantial advancement of the functionality of that device or data processing system in dividing a route into a set of segments, scoring a response to a physical environment associated with a segment in the set of segments, and augmenting, using a content generation model and the score, the physical environment by combining the physical environment and a generated environment.

The illustrative embodiments are described with respect to certain types of routes, vehicles, environments, images, audio data, responses, scores, thresholds, adjustments, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
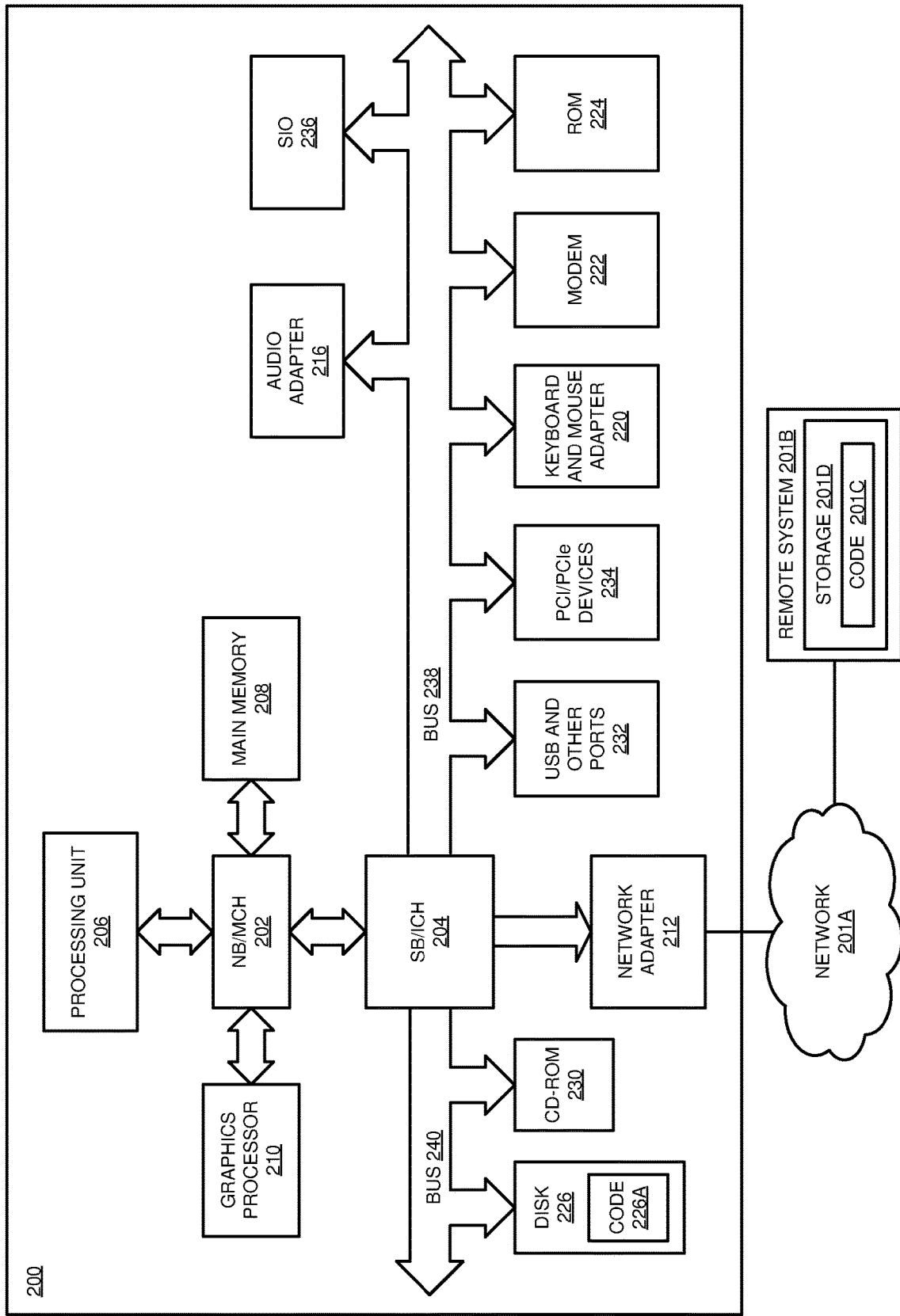
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner. Device 132 includes camera 134, microphone 136, and operator monitoring sensor 138, for use in obtaining data of a physical environment and a vehicle user. Device 132 includes display 139 and speaker 140, for use in providing an augmented environment to a user. Device 132 can be mounted within a vehicle.

Vehicle 142 is an example of a device described herein. For example, vehicle 142 can include a smartphone, a tablet computer, a laptop computer, client 110 in a stationary or a portable form, or any other suitable device. Any software application described as executing in another data processing system in FIG. 1 can be configured to execute in vehicle 142 in a similar manner. Any data or information stored or produced in another data processing system in FIG. 1 can be configured to be stored or produced in vehicle 142 in a similar manner. Vehicle 142 includes camera 144, microphone 146, and operator monitoring sensor 148, for use in obtaining data of a physical environment and a user of vehicle 142. Vehicle 142 includes display 149 and speaker 150, for use in providing an augmented environment to a user of vehicle 142.

Application 105 implements an embodiment described herein. Application 105 executes in any of servers 104 and 106, clients 110, 112, and 114, device 132, and vehicle 142.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D, in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
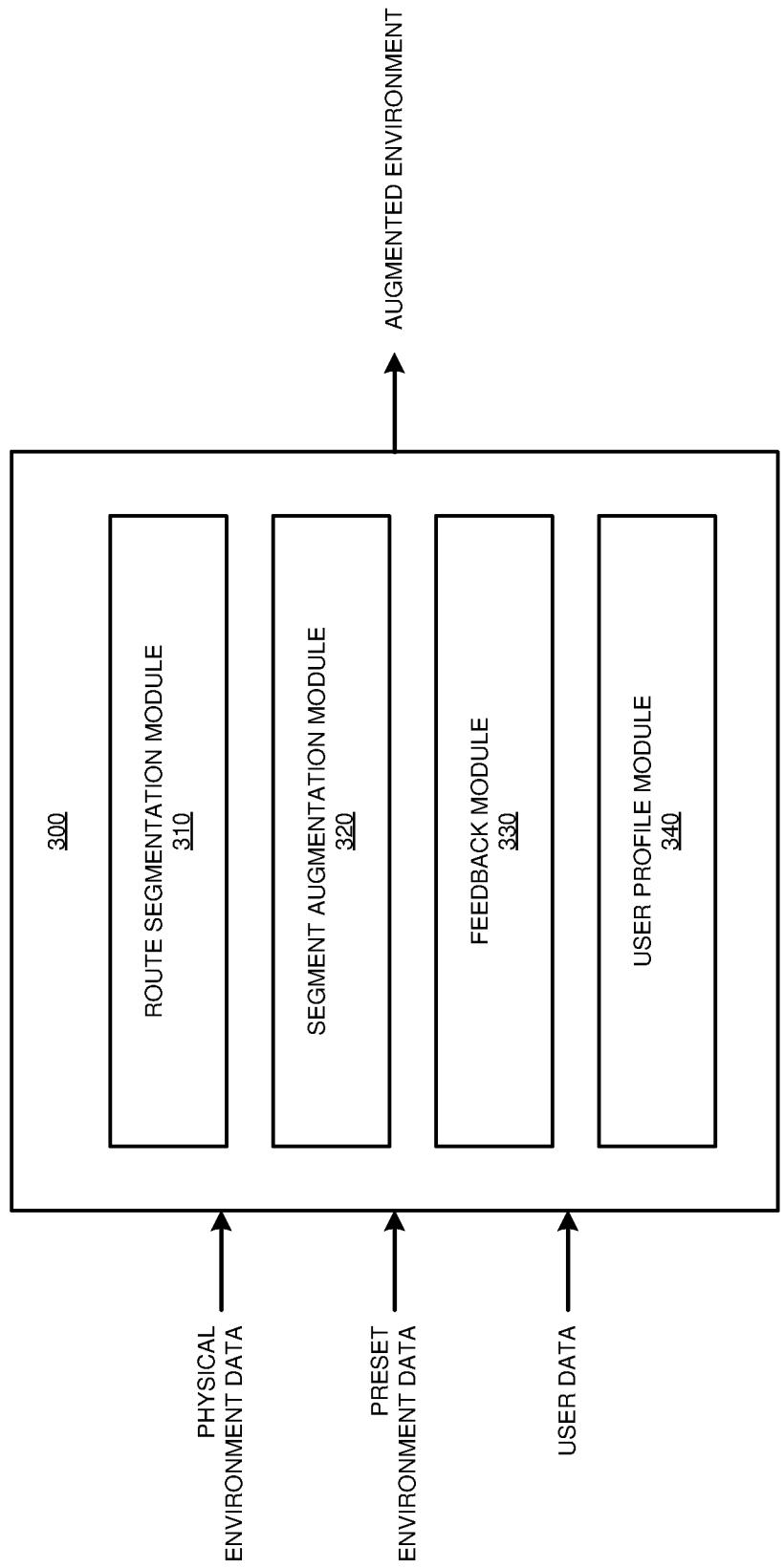
FIG. 3 depicts a block diagram of an example configuration for vehicle based external environment augmentation for operator alertness in accordance with an illustrative embodiment.

With reference to FIG. 3, this figure depicts a block diagram of an example configuration for vehicle based external environment augmentation for operator alertness in accordance with an illustrative embodiment. Application 300 is an example of application 105 in FIG. 1 and executes in any of servers 104 and 106, clients 110, 112, and 114, device 132, and vehicle 142 in FIG. 1.

Application 300 receives data of a vehicle user. The data includes starting and ending physical locations of a journey for which the user is using the vehicle. One implementation of application 300 receives starting and ending physical locations via a user interface from the user. Another implementation of application 300 receives starting and ending physical locations indirectly, for example from route information entered into a mapping application, from route plan data provided to a third party (e.g. a flight plan for an aircraft or a float plan for a boat), or from a user's online activities monitored on an opt-in basis. Optionally, the user data also includes profile data of a user, such as user-supplied data regarding preferences in audio content or physical environment, or data regarding the user's previous interactions with an embodiment.

Application 300 also receives data of a physical environment of the vehicle. Some non-limiting examples of a physical environment of the vehicle are a road on which a vehicle is travelling, terrain along the vehicle's route, and an atmospheric condition along the vehicle's route. The data of a physical environment includes data of a present condition of the environment, and optionally data of a future condition (e.g. a weather forecast for an area along the route for a time at which the vehicle will be in the area). In implementations of application 300, the data of a physical environment includes image data (e.g. obtained using a still image or video camera), audio data (e.g. obtained using a microphone), or both. Application 300 also receives data of one or more preset environments of the vehicle.

Route segmentation module 310 uses a route optimization engine and available physical environment data to optimize a vehicle's route between supplied endpoints and to divide a vehicle's route from one physical location to another into one or more segments. A route optimization engines uses a presently known technique to optimize a vehicle's route between supplied endpoints. In one implementation of module 310, all the route segments are equal in size. Another implementation of module 310 uses the physical environment data to set a segment boundary where some aspect of the physical environment of the route changes, or is expected to change, by more than a threshold amount. For example, module 310 might place a segment boundary where a route changes from a six-lane highway to a rural road, where treeless terrain changes to terrain with more than a threshold percentage of trees, where flat terrain changes to terrain with hills, or where an area forecast to have clear skies changes to an area forecast to have rain.

Segment augmentation module 320 uses a user response analysis model to score a user's response to a physical environment associated with a segment in the set of segments. In one implementation of module 320, the scored user response corresponds to an alertness level of a user. Techniques for determining a user's alertness, or conversely a user's drowsiness, are presently known. In another implementation of module 320, the scored user response corresponds to a mood or sentiment of a user, for example a score within a range from happy to sad or calm to angry. Techniques for scoring user mood are also presently known. In one implementation of module 320, the scored user response is binary (e.g. alert or not alert). In another implementation of module 320, the scored user response is a number within a range (e.g. 6 within a 0-10 range, or 0.6 within a 0-1 range).

Based on the score of a user's response to a physical environment, module 320 generates an environment intended to maintain or improve the user's score. To generate the environment, module 320 uses a content generation model to generate new content or adjust a preset environment or data of a physical environment. Module 320 selects and outputs the generated environment to a vehicle user.

Feedback module 330 uses a user response analysis model to score a user's response to an augmented environment associated with a segment in a manner described herein. Module 330 uses the user's response to further adapt a model used for environment generation to a particular user. User profile module 340 stores user data, including a user's response to a generated environment.

Figure 4:
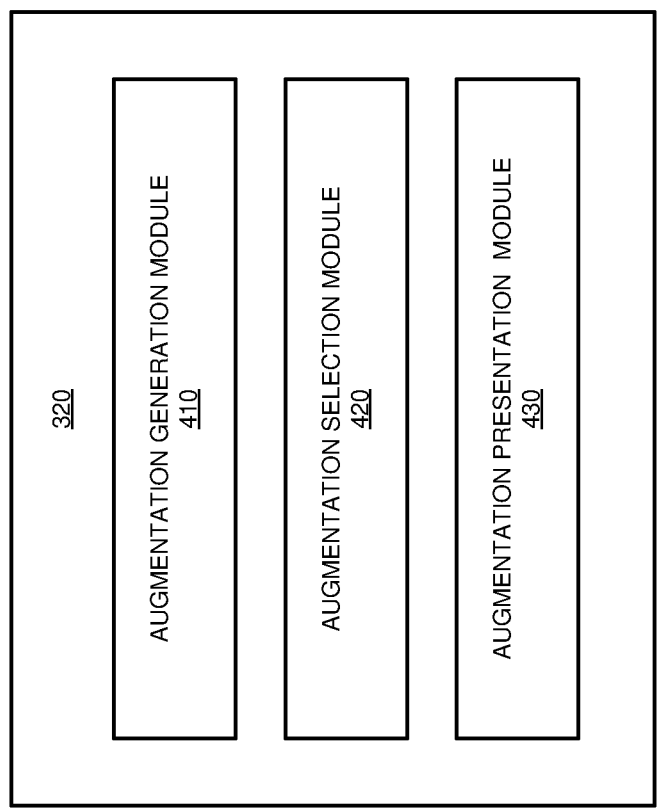
FIG. 4 depicts a block diagram of an example configuration for vehicle based external environment augmentation for operator alertness in accordance with an illustrative embodiment.

With reference to FIG. 4, this figure depicts a block diagram of an example configuration for vehicle based external environment augmentation for operator alertness in accordance with an illustrative embodiment. In particular, FIG. 4 provides more detail of segment augmentation module 320 in FIG. 3.

Augmentation generation module 410 uses a content generation model to generate new content or adjust a preset environment or data of a physical environment. In one implementation of module 410, the content generation model is implemented using a trained GAN. In particular, module 410 uses an image content generation model to generate or adjust an input image, such as an image component of a preset environment or image data of a physical environment of a vehicle, generating an image depicting a generated environment.

Module 410 also uses an audio content generation model to adjust audio data, such as an audio component of a preset environment or audio data of a physical environment of a vehicle, generating audio data of a generated environment. Module 410 also generates data that is not image or audio data Augmentation selection module 420 selects, from an input, generated, or adjusted image, an image depicting a generated environment for display. Augmentation selection module 420 also selects audio data of a generated environment for output to a user. Augmentation selection module 420 also selects data that is not image or audio data for output to a user.

Augmentation presentation module 430 displays an image depicting the generated environment on a display visible to a vehicle user. One implementation of module 430 displays the generated environment as an overlay on top of the real environment of the vehicle, thereby augmenting the real environment by combining the generated and real environments within a user's field of view. Another implementation of module 430 replaces the real environment with the generated environment, for example by projecting a computer-generated image into a user's entire visual field using virtual reality goggles. In one implementation of module 430, real environment replacement is only provided to a vehicle passenger, not a vehicle operator required to monitor the real environment during operation.

Augmentation presentation module 430 uses an audio output device audible to a vehicle operator to provide an audio component of a generated environment to a vehicle user. One implementation of module 430 augments the real environment by combining the generated and real environments within a user's hearing, for example by using an output device that lets in external sound, such as speaker. Another implementation of module 430 replaces the real environment with the generated environment, for example by providing sound through headphones that do not let in external sound. In one implementation of module 430, real environment replacement is only provided to a vehicle passenger, not a vehicle operator required to monitor the real environment during operation.

Augmentation presentation module 430 uses an output device to provide the generated data to a vehicle user, thus combining the generated and real environments for a user.

Figure 5:
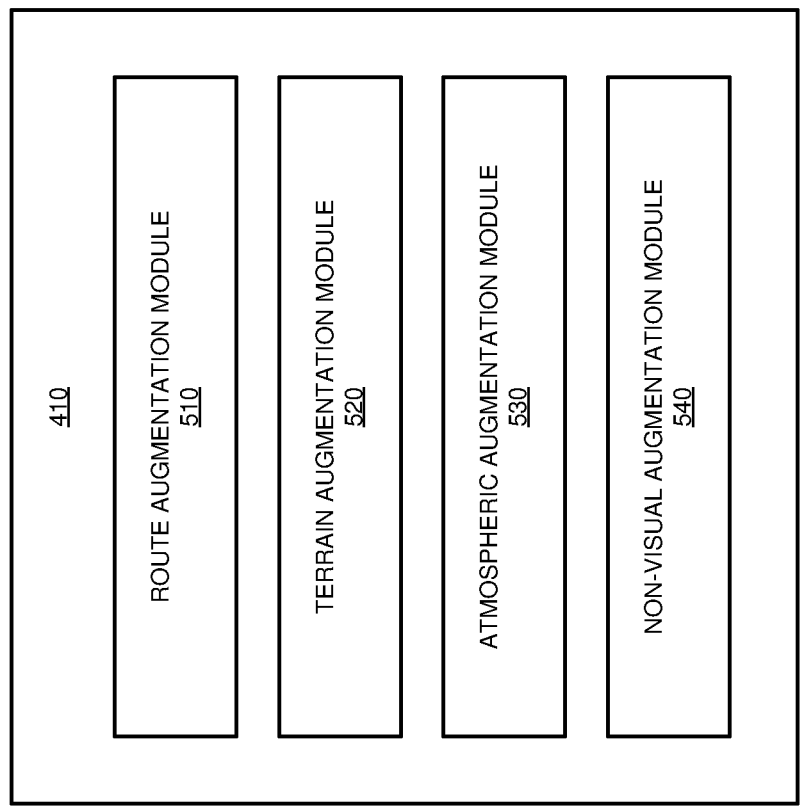
FIG. 5 depicts a block diagram of an example configuration for vehicle based external environment augmentation for operator alertness in accordance with an illustrative embodiment.

With reference to FIG. 5, this figure depicts a block diagram of an example configuration for vehicle based external environment augmentation for operator alertness in accordance with an illustrative embodiment. In particular, FIG. 5 provides more detail of augmentation generation module 410 in FIG. 4.

Route augmentation module 510 uses an image content generation model to generate or adjust an input image, such as an image component of a preset environment or image data of a physical environment of a vehicle, generating an image depicting a route of travel of a vehicle. Terrain augmentation module 520 uses an image content generation model to generate or adjust an input image, such as an image component of a preset environment or image data of a physical environment of a vehicle, generating an image depicting terrain associated with a route of travel. Atmospheric augmentation module 530 uses an image content generation model to generate or adjust an input image, such as an image component of a preset environment or image data of a physical environment of a vehicle, generating an image depicting an atmospheric condition associated with a route of travel. Non-visual augmentation module 540 uses an audio content generation model to adjust audio data, such as an audio component of a preset environment or audio data of a physical environment of a vehicle, generating audio data of a generated environment of the vehicle. Non-visual augmentation module 540 also generates data that is not image or audio data.

Figure 6:
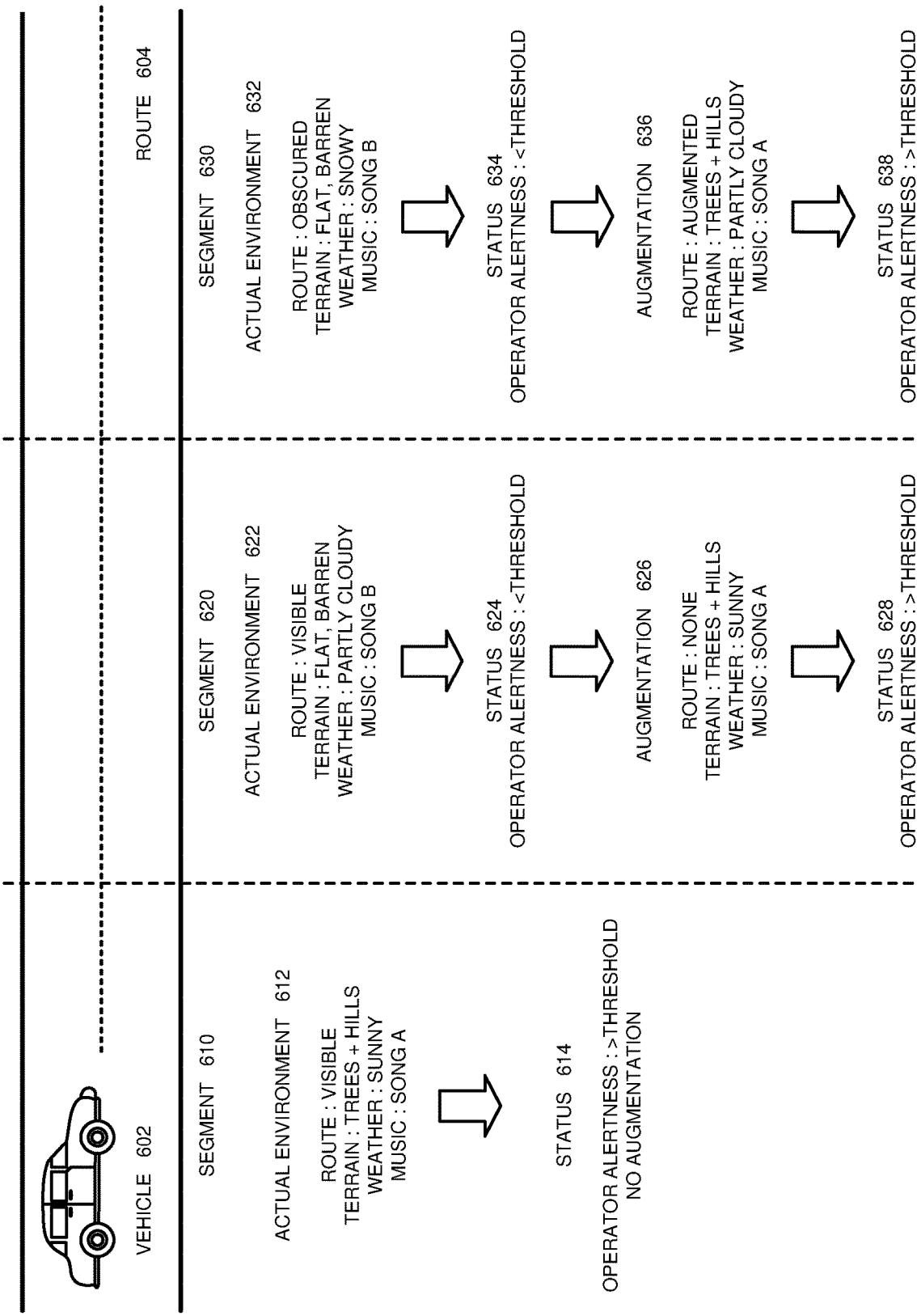
FIG. 6 depicts an example of vehicle based external environment augmentation for operator alertness in accordance with an illustrative embodiment.

With reference to FIG. 6, this figure depicts an example of vehicle based external environment augmentation for operator alertness in accordance with an illustrative embodiment. The example can be executing using application 300 in FIG. 3.

FIG. 6 depicts vehicle 602 proceeding along route 604, which application 300 has segmented into segments 610, 620, and 630.

In segment 610, application 300 receives input regarding actual environment 612, and scores a user of vehicle 602's response to actual environment 612. Because the user has above a threshold level of alertness, no environment augmentation is needed. This result is depicted in status 614.

In segment 620, application 300 receives input regarding actual environment 622, and scores a user of vehicle 602's response to actual environment 622. As depicted in status 624, the user has below a threshold level of alertness. Consequently, application 300 produces augmentation 626, an adjustment of environment 622 adding trees and hills, adjusting an atmospheric condition from partly cloudy to sunny, and altering the music from song B to song A. Application scores a user of vehicle 602's response to augmentation 626, in which the user has above a threshold level of alertness and no environment augmentation is needed. This result is depicted in status 628.

In segment 630, application 300 receives input regarding actual environment 632, and scores a user of vehicle 602's response to actual environment 632. As depicted in status 634, the user has below a threshold level of alertness. Consequently, application 300 produces augmentation 636, an adjustment of environment 632 augmenting route 604 (to compensate for the snowy conditions), adding trees and hills, adjusting an atmospheric condition from snowy to partly cloudy, and altering the music from song B to song A. Application scores a user of vehicle 602's response to augmentation 636, in which the user has above a threshold level of alertness and no environment augmentation is needed. This result is depicted in status 638.

Figure 7:
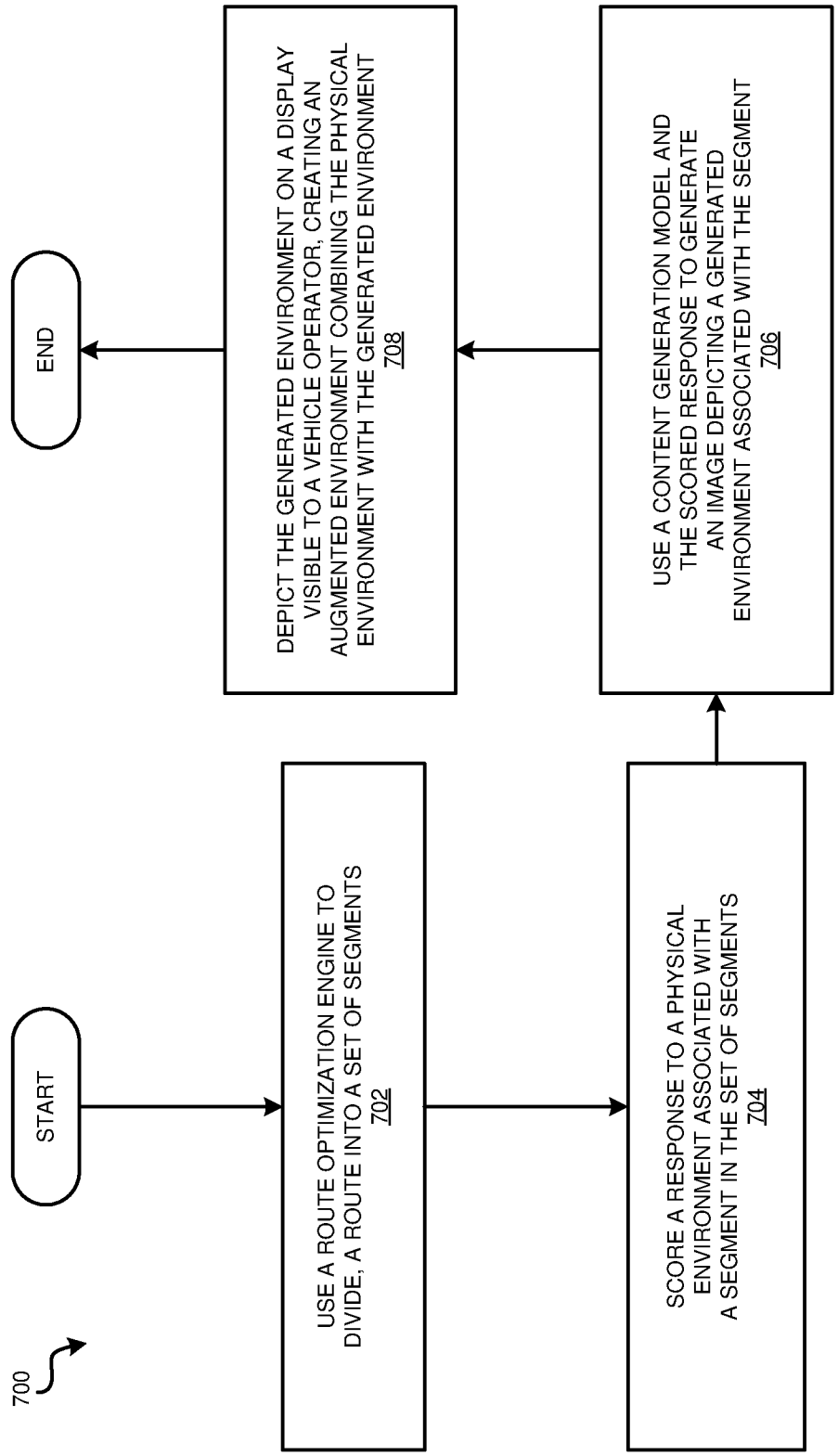
FIG. 7 depicts a flowchart of an example process for vehicle based external environment augmentation for operator alertness in accordance with an illustrative embodiment.

With reference to FIG. 7, this figure depicts a flowchart of an example process for vehicle based external environment augmentation for operator alertness in accordance with an illustrative embodiment. Process 700 can be implemented in application 300 in FIG. 3.

In block 702, the application uses a route optimization engine to divide a route into a set of segments. In block 704, the application scores a response to a physical environment associated with a segment in the set of segments. In block 706, the application uses a content generation model and the scored response to generate an image depicting a generated environment associated with the segment. In block 708, the application depicts the generated environment on a display visible to a vehicle operator, creating an augmented environment combining the physical environment with the generated environment. Then the application ends.

Figure 8:
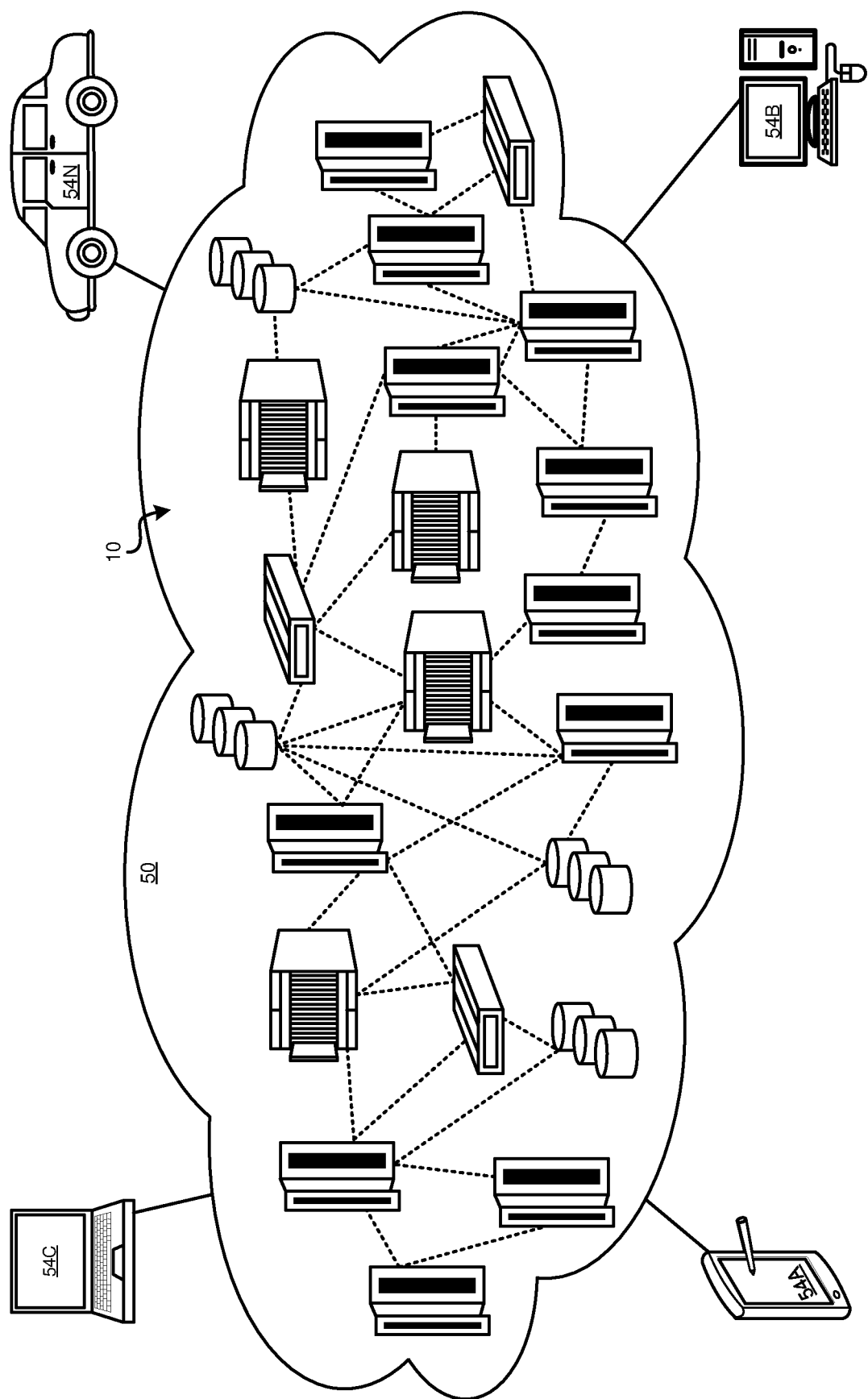
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 9:
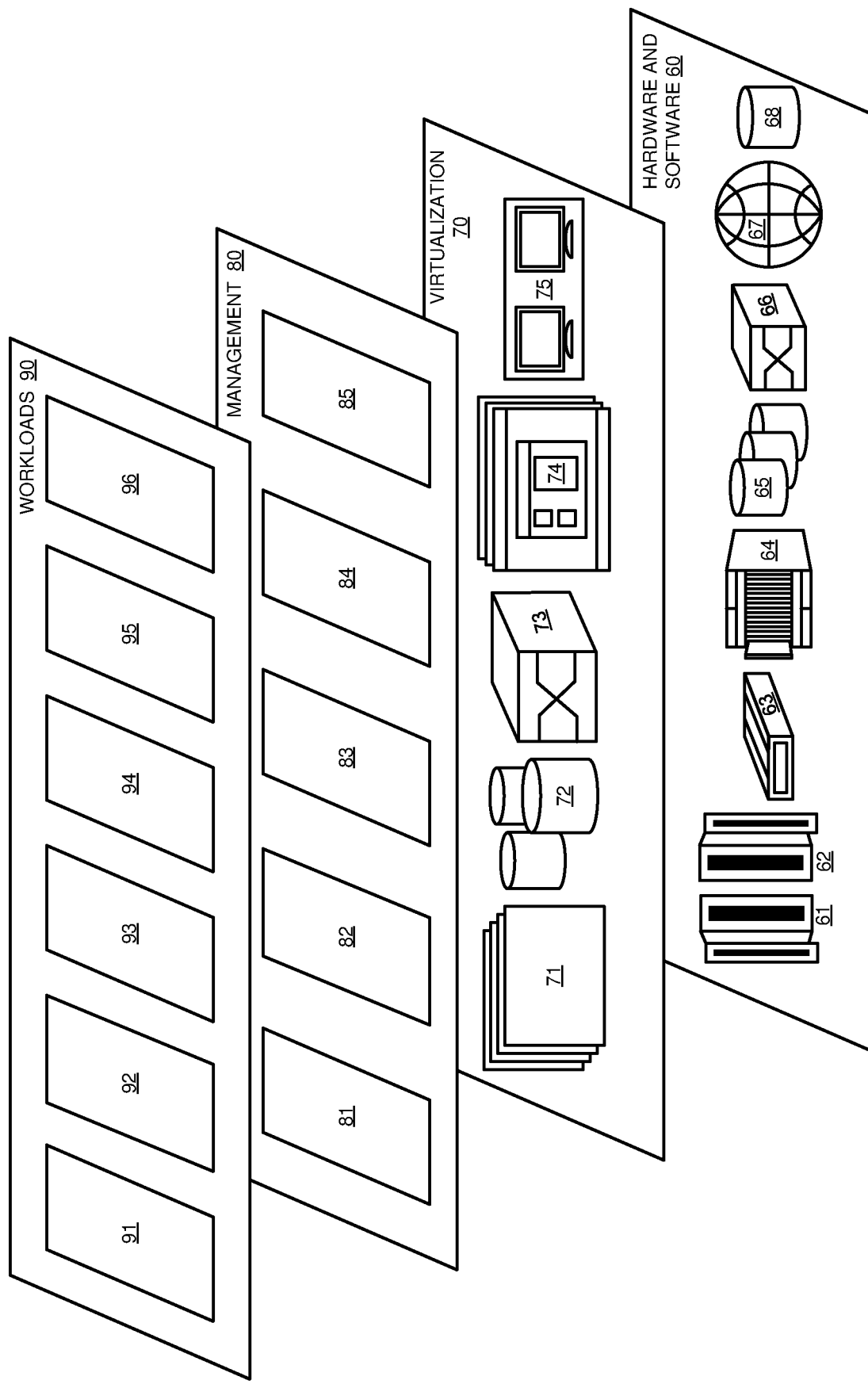
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for vehicle based external environment augmentation for operator alertness and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
dividing, into a set of segments using a route optimization engine, a route from a first physical location to a second physical location;
scoring, using a user response analysis model, an alertness response to a physical environment external to and adjacent to a vehicle travelling within a segment in the set of segments, the scoring resulting in an alertness score ensuring that a vehicle operator is alert enough to respond quickly when necessary; and
augmenting, using a content generation model and the alertness score, the physical environment external to and adjacent to the vehicle, the augmenting combining image data of the physical environment external to and adjacent to the vehicle with image data of a generated environment, the image data of the physical environment external to and adjacent to the vehicle collected while the vehicle is within the segment, the augmenting performed while the vehicle is within the segment and the alertness score is below a threshold, wherein augmenting the physical environment further comprises:
generating, using an image content generation model, the alertness score, a preset generated environment image which the content generation model determined improved the alertness response, and the image data, an image depicting the generated environment; and
depicting, on a display visible to the vehicle operator, the generated environment.

2. The computer-implemented method of claim 1, wherein the generated environment comprises a depiction of a route of travel.

3. The computer-implemented method of claim 1, wherein the generated environment comprises a depiction of terrain associated with a route of travel.

4. The computer-implemented method of claim 1, wherein the generated environment comprises a depiction of an atmospheric condition associated with a route of travel.

5. The computer-implemented method of claim 1, wherein augmenting the physical environment comprises:
generating, using an audio content generation model, the alertness score, and the generated environment, the generated environment comprising audio data; and
outputting, using an audio output device audible to the vehicle operator, the generated environment.

6. The computer-implemented method of claim 1, further comprising:
scoring, using the user response analysis model, a response to the generated environment, the scoring resulting in a scored response;
adjusting, based on the scored response, the generated environment; and
augmenting, using the content generation model, the scored response, and the physical environment, the augmenting combining the physical environment and the adjusted generated environment.

7. A computer program product for vehicle based external environment augmentation, the computer program product comprising:
one or more computer readable storage media, and program instructions collectively stored on the one or more computer readable storage media, the stored program instructions comprising:
program instructions to divide, into a set of segments using a route optimization engine, a route from a first physical location to a second physical location;
program instructions to score, using a user response analysis model, an alertness response to a physical environment external to and adjacent to a vehicle travelling within a segment in the set of segments, the scoring resulting in an alertness score ensuring that a vehicle operator is alert enough to respond quickly when necessary; and
program instructions to augment, using a content generation model and the alertness score, the physical environment external to and adjacent to the vehicle, the augmenting combining image data of the physical environment external to and adjacent to the vehicle with image data of a generated environment, the image data of the physical environment external to and adjacent to the vehicle collected while the vehicle is within the segment, the augmenting performed while the vehicle is within the segment and the alertness score is below a threshold, wherein augmenting the physical environment further comprises:
program instructions to generate, using an image content generation model, the alertness score, a preset generated environment image which the content generation model determined improved the alertness response, and the image data, an image depicting the generated environment; and
program instructions to depict, on a display visible to the vehicle operator, the generated environment.

8. The computer program product of claim 7, wherein the generated environment comprises a depiction of a route of travel.

9. The computer program product of claim 7, wherein the generated environment comprises a depiction of terrain associated with a route of travel.

10. The computer program product of claim 7, wherein the generated environment comprises a depiction of an atmospheric condition associated with a route of travel.

11. The computer program product of claim 7, wherein augmenting the physical environment comprises:
program instructions to generate, using an audio content generation model, the alertness score, and the generated environment, the generated environment comprising audio data; and
program instructions to output, using an audio output device audible to the vehicle operator, the generated environment.

12. The computer program product of claim 7, the stored program instructions further comprising:
program instructions to score, using the user response analysis model, a response to the generated environment, the scoring resulting in a scored response;
program instructions to adjust, based on the scored response, the generated environment; and
program instructions to augment, using the content generation model, the scored response, and the physical environment, the augmenting combining the physical environment and the adjusted generated environment.

13. The computer program product of claim 7, wherein the stored program instructions are stored in the at least one of the one or more storage media of a local data processing system, and wherein the stored program instructions are transferred over a network from a remote data processing system.

14. The computer program product of claim 7, wherein the stored program instructions are stored in the at least one of the one or more storage media of a server data processing system, and wherein the stored program instructions are downloaded over a network to a remote data processing system for use in a computer readable storage device associated with the remote data processing system.

15. The computer program product of claim 7, wherein the computer program product is provided as a service in a cloud environment.

16. A computer system comprising one or more processors, one or more computer-readable memories, and one or more computer-readable storage media, and program instructions stored on at least one of the one or more storage media for execution by at least one of the one or more processors via at least one of the one or more memories, the stored program instructions comprising:
program instructions to divide, into a set of segments using a route optimization engine, a route from a first physical location to a second physical location;
program instructions to score, using a user response analysis model, an alertness response to a physical environment external to and adjacent to a vehicle travelling within a segment in the set of segments, the scoring resulting in an alertness score ensuring that a vehicle operator is alert enough to respond quickly when necessary; and
program instructions to augment, using a content generation model and the alertness score, the physical environment external to and adjacent to the vehicle, the augmenting combining image data of the physical environment external to and adjacent to the vehicle with image data of a generated environment, the image data of the physical environment external to and adjacent to the vehicle collected while the vehicle is within the segment, the augmenting performed while the vehicle is within the segment and the alertness score is below a threshold, wherein augmenting the physical environment further comprises:
program instructions to generate, using an image content generation model, the alertness score, a preset generated environment image which the content generation model determined improved the alertness response, and the image data, an image depicting the generated environment; and
program instructions to depict, on a display visible to the vehicle operator, the generated environment.

17. The computer system of claim 16, wherein the generated environment comprises a depiction of a route of travel.

18. A computer-implemented method comprising:
dividing, into a set of segments using a route optimization engine, a route from a first physical location to a second physical location;
scoring, using a user response analysis model, an alertness response to a physical environment external to and adjacent to a vehicle travelling within a segment in the set of segments, the scoring resulting in an alertness score ensuring that a vehicle operator is alert enough to respond quickly when necessary;
augmenting, using a content generation model and the alertness score, the physical environment external to and adjacent to the vehicle, the augmenting combining image data of the physical environment external to and adjacent to the vehicle with image data of a generated environment, the image data of the physical environment external to and adjacent to the vehicle collected while the vehicle is within the segment, the augmenting performed while the vehicle is within the segment and the alertness score is below a threshold, wherein augmenting the physical environment further comprises:
generating, using an image content generation model, the alertness score, a preset generated environment image which the content generation model determined improved the alertness response, and the image data, an image depicting the generated environment;
depicting, on a display visible to the vehicle operator, the generated environment, wherein the generated environment comprises a depiction of a route of travel, a depiction of terrain associated with the route of travel, and a depiction of an atmospheric condition associated with the route of travel;
generating, using an audio content generation model, the alertness score, and the generated environment, the generated environment comprising audio data; and
outputting, using an audio output device audible to the vehicle operator, the generated environment;
scoring, using the user response analysis model, a response to the generated environment, the scoring resulting in a scored response;
adjusting, based on the scored response, the generated environment; and
augmenting, using the content generation model, the scored response, and the physical environment, the augmenting combining the physical environment and the adjusted generated environment.

19. A computer-implemented method comprising:
dividing, into a set of segments using a route optimization engine, a route from a first physical location to a second physical location;
scoring, using a user response analysis model, an alertness response to a physical environment external to and adjacent to a vehicle travelling within a segment in the set of segments, the scoring resulting in an alertness score ensuring that a vehicle operator is alert enough to respond quickly when necessary;
augmenting, using a content generation model and the alertness score, the physical environment external to and adjacent to the vehicle, the augmenting combining image data of the physical environment external to and adjacent to the vehicle with image data of a generated environment, the image data of the physical environment external to and adjacent to the vehicle collected while the vehicle is within the segment, the augmenting performed while the vehicle is within the segment and the alertness score is below a threshold, wherein augmenting the physical environment further comprises:
generating, using an image content generation model, the alertness score, a preset generated environment image which the content generation model determined improved the alertness response, and the image data, an image depicting the generated environment; and
depicting, on a display visible to the vehicle operator, the generated environment; and responding to a vehicle operator's input in response to the vehicle operator taking control of the vehicle due to a determination of necessity, based in part on the generated environment on the display.

* * * * *